United States Patent
Lin

(10) Patent No.: US 11,909,634 B2
(45) Date of Patent: Feb. 20, 2024

(54) ISCSI MULTIPATH MANAGEMENT SYSTEM AND METHOD, DEVICE, AND STORAGE MEDIUM

(71) Applicant: INSPUR SUZHOU INTELLIGENT TECHNOLOGY CO., LTD., Jiangsu (CN)

(72) Inventor: Haotian Lin, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/005,707

(22) PCT Filed: Feb. 19, 2021

(86) PCT No.: PCT/CN2021/076940
§ 371 (c)(1),
(2) Date: Jun. 21, 2023

(87) PCT Pub. No.: WO2022/021853
PCT Pub. Date: Feb. 3, 2022

(65) Prior Publication Data
US 2023/0269180 A1 Aug. 24, 2023

(30) Foreign Application Priority Data
Jul. 28, 2020 (CN) .......................... 202010738743.4

(51) Int. Cl.
*H04L 45/02* (2022.01)
*H04L 45/00* (2022.01)
*H04L 45/74* (2022.01)

(52) U.S. Cl.
CPC .............. *H04L 45/54* (2013.01); *H04L 45/02* (2013.01); *H04L 45/74* (2013.01)

(58) Field of Classification Search
CPC .......... H04L 45/54; H04L 45/02; H04L 45/74
(Continued)

(56) References Cited

U.S. PATENT DOCUMENTS 7,633,955 B1 * 12/2009 Saraiya ................. H04L 49/357
370/395.31
7,685,254 B2 * 3/2010 Pandya ............... G06F 9/30029
709/200
(Continued)

FOREIGN PATENT DOCUMENTS

| CN | 101821725 A | 9/2010 |
|---|---|---|
| CN | 102281263 A | 12/2011 |

(Continued)

OTHER PUBLICATIONS

International Search report for PCT/CN2021/076940 dated May 18, 2021.
Chinese search report for application No. 202010738743.4.

*Primary Examiner* — Anthony Mejia
(74) *Attorney, Agent, or Firm* — Dennemeyer & Associates LLC; Victoria Friedman

(57) ABSTRACT

An iscsi multi-path management system includes a connection module and a routing module deployed at a client. The routing module is adapted to update and maintain a routing table according to real-time updates, the routing table records legitimate paths conforming to a black/white list rule. The connection module includes a connector and a storage volume manager, the connector is adapted to search for an iscsi target that conforms to the black/white list rule at a storage end, establish an iscsi session through a legitimate path, and notify the storage volume manager to execute a mount volume operation; and the connector is further adapted to regularly recheck the established iscsi session according to an updated black/white list rule, and regularly update and acquire the iscsi target at the storage end, so as (Continued)

to establish the iscsi session with the newly acquired iscsi target that conforms to the updated black/white list rule.

20 Claims, 2 Drawing Sheets

(58) Field of Classification Search
USPC .......................................................... 709/238
See application file for complete search history.

(56) References Cited

U.S. PATENT DOCUMENTS

| | | | |
|---|---|---|---|
| 8,463,941 B1 * | 6/2013 | Welch | H04L 67/564 |
| | | | 709/239 |
| 2005/0120134 A1 * | 6/2005 | Hubis | G06F 12/0866 |
| | | | 711/E12.019 |
| 2009/0138608 A1 | 5/2009 | Arroyo et al. | |
| 2017/0064007 A1 * | 3/2017 | Brown | H04L 67/02 |
| 2018/0357429 A1 * | 12/2018 | Barzik | H04L 63/0263 |
| 2020/0026623 A1 | 1/2020 | Dillaman | |

FOREIGN PATENT DOCUMENTS

| | | | | |
|---|---|---|---|---|
| CN | 111290915 A | 6/2020 | | |
| CN | 111901245 A | 11/2020 | | |
| IN | 103297441 A | 9/2013 | | |
| WO | WO-2010065271 A2 * | 6/2010 | .......... | G06F 11/1402 |

* cited by examiner

ISCSI MULTIPATH MANAGEMENT SYSTEM AND METHOD, DEVICE, AND STORAGE MEDIUM

CROSS-REFERENCE TO RELATED APPLICATIONS

This is a 35 U.S.C. 371 National Stage Patent Application of International Application No. PCT/CN2021/076940, filed Feb. 19, 2021, which claims priority to Chinese application 202010738743.4, filed Jul. 28, 2020, each of which is hereby incorporated by reference in its entirety.

TECHNICAL FIELD

The present disclosure relates to the field of storage technologies, and in particular, to an Internet Small Computer System Interface (iscsi) multi-path management system and method, an electronic device, and a computer-readable storage medium.

BACKGROUND

An Internet Small Computer System Interface (iscsi) is a technical standard based on Internet Protocol (IP) network communication and Small Computer System Interface (SCSI) storage interface, and supports transmission of an SCSI instruction through an IP bearer, so as to realize cross-network access of a storage device. The iscsi technology can directly use the existing network topology, which reduces the cost and simplifies the usage, and therefore is widely used in the field of storage.

In the networking of a storage system, there is often more than one physical or logical link between a host of a client and a storage end, so the host may be connected to the same device at the storage end through a plurality of links. The multi-path technology may perform, at a host end, aggregation management for the same device under a plurality of links, so as to improve the transmission rate, and provide features of load balancing, handover during failure, etc. The multi-path technology is a technology for connecting and aggregating the host and the storage device through a plurality of paths simultaneously.

In the related art, paths of a multi-path management system of a storage system are generally fixed once being configured. However, there may be such application scenarios in practical applications: the links between the client and the storage end are uncertain, for example, the number of links may be increased with the expansion of the network topology; and the type of load traffic on the links is also uncertain, for example, the links may be used for bearing iscsi traffic, or may be used for bearing the traffic of an exterior service. Thus, it is necessary to repeatedly change and adjust related configuration in the management system in the related art, which has low efficiency.

In view of the above, it is urgently concerned by those having ordinary skill in the art to provide a solution to solve the abovementioned technical problems.

SUMMARY

Embodiments of the present disclosure provide an iscsi multi-path management system and method, an electronic device, and a computer-readable storage medium, which may effectively realize adaptive adjustment according to the needs and changes of application scenarios, improve applicability of the multi-path management system, simplify configuration and reduce configuration workload, and improve efficiency.

In a first aspect, the embodiments of the present disclosure provide an iscsi multi-path management system, which includes a connection module and a routing module that are deployed at a client.

The routing module is adapted to update and maintain a routing table according to a current network topology. The routing table records legitimate paths that are between a storage end and the client and conform to a black/white list rule.

The connection module includes a connector and a storage volume manager. The connector is adapted to search for each iscsi target that conforms to the black/white list rule at the storage end, establish an iscsi session through a legitimate path, and notify the storage volume manager to execute a mount volume operation. The connector is further adapted to regularly recheck the established iscsi session according to an updated black/white list rule, and regularly update and acquire the iscsi target at the storage end, so as to establish the iscsi session with the newly acquired iscsi target that conforms to the updated black/white list rule.

In some exemplary implementations, the black/white list rule is stored in a form of a blacklist and/or a whitelist. The blacklist and the whitelist are generated by the routing module according to an input configuration instruction.

The blacklist records port IPs and network links that are not allowed to bear iscsi traffic. The whitelist records port IPs and network links that are allowed to bear iscsi traffic.

In some exemplary implementations, the routing module includes: a first initialization unit, a second initialization unit, an updating adjustment unit, and a path generation unit.

The first initialization unit is adapted to determine port IPs and network links that are allowed to bear iscsi traffic in the storage end according to the black/white list rule, wherein the port IPs determined by the first initialization unit form a first IP set, and the network links determined by the first initialization unit form a first link set.

The second initialization unit is adapted to determine network links that are allowed to bear iscsi traffic in the client according to the black/white list rule, wherein the network links determined by the second initialization unit form a second link set.

The updating adjustment unit is adapted to regularly acquire and update the first IP set, the first link set, and the second link set according to the updated black/white list rule.

The path generation unit is adapted to configure a legitimate path with the client for each port IP in the first IP set in a legitimate network topology. The legitimate network topology is a network topology formed by the first link set and the second link set.

In some exemplary implementations, the path generation unit is adapted to:

configure the legitimate path with the client for each port IP in the first IP set in the legitimate network topology according to a load balancing principle.

In some exemplary implementations, the routing module further includes: a third first initialization unit.

The third initialization unit is adapted to determine network links that are allowed to bear iscsi traffic between other devices in a network according to the black/white list rule, wherein the network links determined by the third initialization unit form a third link set.

The legitimate network topology is a network topology formed by the first link set, the second link set, and the third link set.

In some exemplary implementations, the connector, when rechecking the established iscsi session regularly according to the updated black/white list rule, is adapted to:

regularly acquire the updated black/white list rule, and log off iscsi sessions, that are in an invalid state or do not conform to the updated black/white list rule, in respective currently established iscsi sessions.

In some exemplary implementations, the connector is further adapted to:

notify the storage volume manager to execute an unmount volume operation in a case where there is no remaining valid iscsi session after logging off the iscsi sessions, that are in the invalid state or do not conform to the updated black/white list rule, in the respective currently established iscsi sessions.

In a second aspect, the embodiments of the present disclosure provide an iscsi multi-path management method, which is applied to a client. The client stores a routing table that is updated and maintained in real time according to a current network topology, and the routing table records legitimate paths that are between a storage end and the client and conform to a black/white list rule. The method includes the following operations.

Each iscsi target that conforms to the black/white list rule at the storage end is queried.

An iscsi session is established with the iscsi target that conforms to the black/white list rule through a legitimate path, and a corresponding mount volume operation is executed.

The established iscsi session is rechecked regularly according to an updated black/white list rule.

The iscsi target at the storage end is updated and acquired regularly, so as to establish the iscsi session with the newly acquired iscsi target that conforms to the updated black/white list rule.

In some exemplary implementations, the black/white list rule is stored in a form of a blacklist and/or a whitelist. The blacklist and the whitelist are generated according to an input configuration instruction.

The blacklist records port IPs and network links that are not allowed to bear iscsi traffic. The whitelist records port IPs and network links that are allowed to bear iscsi traffic.

In some exemplary implementations, a generation process of the routing table includes the following operations.

Port IPs and network links that are allowed to bear iscsi traffic in the storage end are determined according to the black/white list rule, wherein the determined port IPs form a first IP set, and the determined network links form a first link set.

Network links that are allowed to bear iscsi traffic in the client are determined according to the black/white list rule, wherein the determined network links form a second link set.

The first IP set, the first link set, and the second link set are regularly acquired and updated according to the updated black/white list rule.

A legitimate path with the client is configured for each port IP in the first IP set in a legitimate network topology. The legitimate network topology is a network topology formed by the first link set and the second link set.

In some exemplary implementations, the operation that the legitimate path with the client is configured for each port IP in the first IP set in the legitimate network topology includes the following operation.

The legitimate path with the client is configured for each port IP in the first IP set in the legitimate network topology according to a load balancing principle.

In some exemplary implementations, a generation process of the routing table further includes the following operations.

Network links that are allowed to bear iscsi traffic between other devices in a network are determined according to the black/white list rule, wherein the determined network links form a third link set. The legitimate network topology is a network topology formed by the first link set, the second link set, and the third link set.

In some exemplary implementations, the operation that the established iscsi session is rechecked regularly according to the updated black/white list rule includes the following operations.

The updated black/white list rule is acquired regularly, and iscsi sessions, that are in an invalid state or do not conform to the updated black/white list rule, in respective currently established iscsi sessions are logged off.

In some exemplary implementations, after the iscsi sessions, that are in the invalid state or do not conform to the updated black/white list rule, in respective currently established iscsi sessions are logged off, the method further includes the following operations.

Whether there is a remaining valid iscsi session is determined.

In a case where there is no remaining valid session, then a storage volume manager is notified to execute an unmount volume operation.

In a third aspect, the embodiments of the present disclosure provide an electronic device, which includes: a memory and a processor.

The memory is adapted to store a computer program.

The processor is adapted to execute the computer program to implement the operations of any iscsi multi-path management method as described above.

In a fourth aspect, the embodiments of the present disclosure provide a computer-readable storage medium. The computer-readable storage medium stores a computer program. The computer program is used for implementing the operations of any iscsi multi-path management method as described above when being executed by a processor.

The iscsi multi-path management system and method, the electronic device, and the computer-readable storage medium provided by the embodiments of the present disclosure have the following beneficial effects. The routing module is adapted to update and set the legitimate path that allows to bear the iscsi traffic in real time, so that the connection module creates the iscsi session for the corresponding iscsi target according to the corresponding legitimate path, and regularly updates the black/white list rule and the iscsi target at the storage end, thereby realizing adaptive iscsi path adjustment under a plurality of application scenarios and application requirements, that is, automatically querying all iscsi targets, automatically connecting the legitimate iscsi targets, and automatically logging off the invalid illegitimate iscsi sessions. Therefore, the solution in the embodiments of the present disclosure may effectively improve applicability of the multi-path management system, greatly simplify configuration and reduce configuration workload, and improve management efficiency.

BRIEF DESCRIPTION OF THE DRAWINGS

To describe technical solutions in the related art and the embodiments of the present disclosure more clearly, the following briefly describes the accompanying drawings required for the descriptions in the related art and the embodiments of the present disclosure. Of course, the following drawings related to the embodiments of the present disclosure describe only a part of the embodiments of the present disclosure. For those having ordinary skill in the art, other drawings may also be derived according to the drawings provided herein without creative efforts, and the other drawings derived also belong to the scope of protection of the present disclosure.

DETAILED DESCRIPTION

The embodiments of the present disclosure provide an iscsi multi-path management system and method, an electronic device, and a computer-readable storage medium, which may effectively realize adaptive adjustment according to the needs and changes of application scenarios, improve applicability of the multi-path management system, simplify configuration and reduce configuration workload, and improve efficiency.

To describe the technical solutions in the embodiments of the present disclosure more clearly and comprehensively, the technical solutions in the embodiments of the present disclosure will be described below with reference to the drawings. All other embodiments obtained by those having ordinary skill in the art based on the embodiments of the present disclosure without creative efforts shall fall within the scope of protection of the present disclosure.

An iscsi is a technical standard based on IP network communication and SCSI storage interface, and supports transmission of an SCSI instruction through an IP bearer, so as to realize cross-network access of a storage device. The iscsi technology can directly use the existing network topology, which reduces the cost and simplifies the usage, and therefore is widely used in the field of storage.

In the networking of a storage system, there is often more than one physical or logical link between a host of a client and a storage end, so the host may be connected to the same device at the storage end through a plurality of links. The multi-path technology may perform, at a host end, aggregation management for the same device under a plurality of links, so as to improve the transmission rate, and provide features of load balancing, handover during failure, etc. The multi-path technology is a technology for connecting and aggregating the host and the storage device through a plurality of paths simultaneously.

In the related art, paths of a multi-path management system of a storage system are generally fixed once being configured. However, there may be such application scenarios in practical applications: the links between the client and the storage end are uncertain, for example, the number of links may be increased with the expansion of the network topology; and the type of load traffic on the links is also uncertain, for example, the links may be used for bearing iscsi traffic, or may be used for bearing the traffic of an exterior service. Thus, it is necessary to repeatedly change and adjust related configuration in the management system in the related art, which has low efficiency.

In view of the above, the embodiments of the present disclosure provide an iscsi multi-path management solution, which may effectively solve the abovementioned problems.

Figure 1:
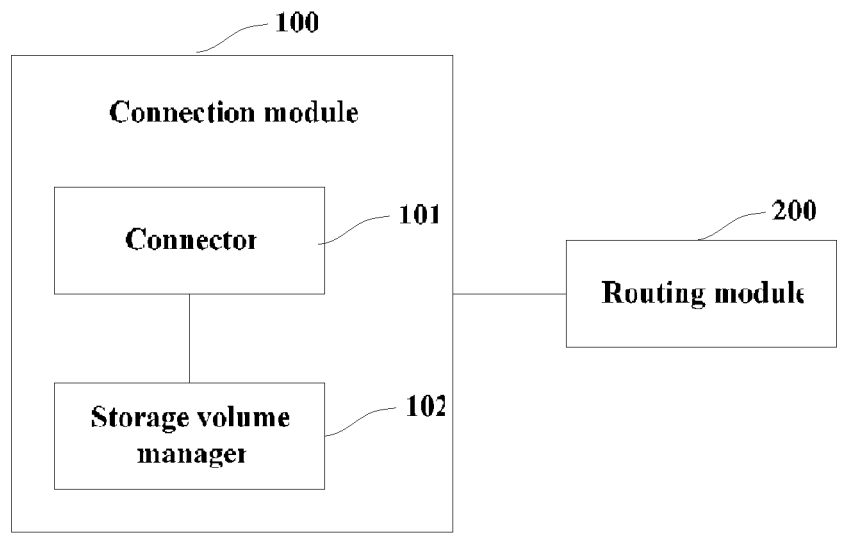
FIG. 1 illustrates a block structural diagram of an iscsi multi-path management system according to the embodiments of the present disclosure.

Referring to FIG. 1, the embodiments of the present disclosure provide an iscsi multi-path management system, which mainly includes a connection module 100 and a routing module 200 that are deployed at a client.

The routing module 200 is adapted to update and maintain a routing table according to a current network topology, wherein the routing table records legitimate paths that are between a storage end and a client and conform to a black/white list rule.

The connection module 100 includes a connector 101 and a storage volume manager 102. The connector 101 is adapted to search for each iscsi target that conforms to the black/white list rule at the storage end, establish an iscsi session through a legitimate path, and notify the storage volume manager 102 to execute a mount volume operation; and the connector is further adapted to regularly recheck the established iscsi session according to an updated black/white list rule, and regularly update and acquire the iscsi target at the storage end, so as to establish the iscsi session with the newly acquired iscsi target that conforms to the updated black/white list rule.

Specifically, it is to be noted that, in the multi-path management system provided in the embodiments of the present disclosure, the connection module 100 is adapted to perform adaptive connection between the client and the storage end, that is, to establish the corresponding iscsi session, to manage a legitimate connection and limit an illegitimate connection. The routing module 200 is adapted to configure a legitimate routing path under manual planning and automatically adjust a connection path in the network topology.

The routing module 200 is adapted to configure a legitimate path according to the black/white list rule. It is to be noted that the legitimate path refers to a path that the black/white list rule allows to bear the iscsi traffic, that is, allows to execute an iscsi service. The black/white list rule may be managed and set by an administrator.

In the connection module 100, the connector 101 may be a self-started service on a host of the client. After starting, the connector 101 may access the storage end after a dependent service is ready to start, query each iscsi target at the storage end, and determine whether each iscsi target conforms to the black/white list rule. If the iscsi target conforms to the black/white list rule, a connection to the port IP of the iscsi target may be carried out, the corresponding iscsi session may be established, and the storage volume manager 102 is notified to execute a mount volume operation for a volume corresponding to the iscsi session.

It is to be emphasized that the solution provided in the embodiments of the present disclosure may be applicable to a scenario where user requirements change constantly. Therefore, in the embodiments of the present disclosure, the connector 101 will regularly acquire the updated black/white list rule constantly after preliminarily completing the establishment of the iscsi session between the client and the storage end, and recheck the iscsi session that has been established. The recheck is to repeatedly check whether the iscsi session conforms to the updated black/white list rule.

If the iscsi session conforms to the updated black/white list rule, then the iscsi session may be maintained; otherwise, the iscsi session is logged off.

In addition, the solution provided in the embodiments of the present disclosure is also suitable for a scenario where the network topology changes constantly. Therefore, in the embodiments of the present disclosure, the connector will constantly acquire the iscsi target at the storage end regularly after preliminarily completing the establishment of the iscsi session between the client and the storage end, and determines whether some new iscsi targets that also conform to the black/white list rule have been added, so as to also establish the iscsi session to these new iscsi targets.

It can be seen that, in the iscsi multi-path management system according to the embodiments of the present disclosure, the routing module 200 is adapted to update and set the legitimate path that allows to bear the iscsi traffic in real time, so that the connection module 100 creates the iscsi session for the corresponding iscsi target according to the corresponding legitimate path, and regularly updates the black/white list rule and the iscsi target at the storage end, thereby realizing adaptive iscsi path adjustment under a plurality of application scenarios and application requirements, that is, automatically querying all iscsi targets, automatically connecting the legitimate iscsi targets, and automatically logging off the invalid illegitimate iscsi sessions. Therefore, the solution in the embodiments of the present disclosure may effectively improve applicability of the multi-path management system, greatly simplify configuration and reduce configuration workload, and improve management efficiency.

In some exemplary embodiments, on the basis of the abovementioned content of the iscsi multi-path management system according to the embodiments of the present disclosure, the black/white list rule is stored in a form of a blacklist and/or a whitelist. The blacklist and the whitelist are generated by the routing module 200 according to an input configuration instruction.

The blacklist records port IPs and network links that are not allowed to bear iscsi traffic. The whitelist records port IPs and network links that are allowed to bear iscsi traffic.

In the embodiments, the blacklist or the whitelist records a port IP and a network link of each object. Thus, when the port IP of a certain iscsi target appears in the blacklist, then the iscsi target will be regarded as an illegitimate path in the iscsi path management; while when the port IP of a certain iscsi target appears in the whitelist, then the iscsi target will be regarded as a legitimate path in the iscsi path management.

In some exemplary embodiments, on the basis of the abovementioned content of the iscsi multi-path management system according to the embodiments of the present disclosure, the routing module 200 includes a first initialization unit, a second initialization unit, an updating adjustment unit, and a path generation unit.

The first initialization unit is adapted to determine port IPs and network links that are allowed to bear iscsi traffic in the storage end according to the black/white list rule, wherein the port IPs determined by the first initialization unit form a first IP set, and the network links determined by the first initialization unit form a first link set.

The second initialization unit is adapted to determine network links that are allowed to bear iscsi traffic in the client according to the black/white list rule, wherein the network links determined by the second initialization unit form a second link set.

The updating adjustment unit is adapted to regularly acquire and update the first IP set, the first link set, and the second link set according to the updated black/white list rule.

The path generation unit is adapted to configure a legitimate path with the client for each port IP in the first IP set in a legitimate network topology. The legitimate network topology is a network topology formed by the first link set and the second link set.

Specifically, the first IP set that provides the iscsi service in the storage end is I={ip1, ip2, . . . , ipN}, and the first link set is L1={link1, link2, . . . , linkM}. In the client, the second link set that is allowed to provide the iscsi service is L2={l1, l2, . . . , lS}.

The first link set L1 and the second link set L2 form a legitimate network topology T. In the legitimate network topology T, there are a plurality of legitimate paths between each group of <linka, lb>. Herein, linka and lb are respectively the elements in the first link set L1 and the second link set L2. Therefore, the routing module 200 may further plan a legitimate path with the client and configure a routing table for each port IP in the first IP set in the legitimate network topology T.

In some exemplary embodiments, on the basis of the abovementioned content of the iscsi multi-path management system according to the embodiments of the present disclosure, the path generation unit is adapted to:

configure the legitimate path with the client for each port IP in the first IP set in the legitimate network topology according to a load balancing principle.

In the embodiments, the routing module 200 preferably selects a relevant link according to the load balancing principle during configuring the routing table.

In some exemplary embodiments, on the basis of the abovementioned content of the iscsi multi-path management system according to the embodiments of the present disclosure, the routing module 200 further includes a third initialization unit.

The third initialization unit is adapted to determine network links that are allowed to bear iscsi traffic between other devices in a network according to the black/white list rule, wherein the network links determined by the third initialization unit form a third link set.

The legitimate network topology is a network topology formed by the first link set, the second link set, and the third link set.

In the embodiments, there may be other devices in the storage system in addition to the storage end and the client. If relevant network links established by the other devices are allowed to bear the iscsi traffic, then the legitimate network topology T may also be formed by the third link set in addition to the first link set and the second link set.

In some exemplary embodiments, on the basis of the abovementioned content of the iscsi multi-path management system according to the embodiments of the present disclosure, the connector 101, when rechecking the established iscsi session regularly according to the updated black/white list rule, is adapted to:

regularly acquire the updated black/white list rule, and log off iscsi sessions, that are in an invalid state or do not conform to the updated black/white list rule, in respective currently established iscsi sessions.

In some exemplary embodiments, on the basis of the abovementioned content of the iscsi multi-path management system according to the embodiments of the present disclosure, the connector 101 is further adapted to:

notify the storage volume manager 102 to execute an unmount volume operation in a case where there is no remaining valid iscsi session after logging off the iscsi sessions, that are in the invalid state or do not conform to the updated black/white list rule, in the respective currently established iscsi sessions.

The valid iscsi session is an iscsi session that is in an available state and is reserved for conforming to the updated black/white list rule.

When the storage volume manager 102 executes the mount volume operation, the storage volume manager 102 acquires a Universally Unique Identifier (UUID) corresponding to a storage volume, queries whether there is a multi-path device corresponding to the UUID by accessing a multi-path driver, mounts the multi-path device in a case where there is the multi-path device corresponding to the UUID, and returns corresponding prompt information in a case where there is no multi-path device corresponding to the UUID.

When the storage volume manager 102 performs the unmount volume operation, the storage volume manager 102 acquires a UUID corresponding to the storage volume, queries a multi-path device corresponding to the UUID by accessing the multi-path driver, queries iscsi devices in various iscsi sessions corresponding to the multi-path device, deletes these queried iscsi devices, and then deletes the multi-path device.

Figure 2:
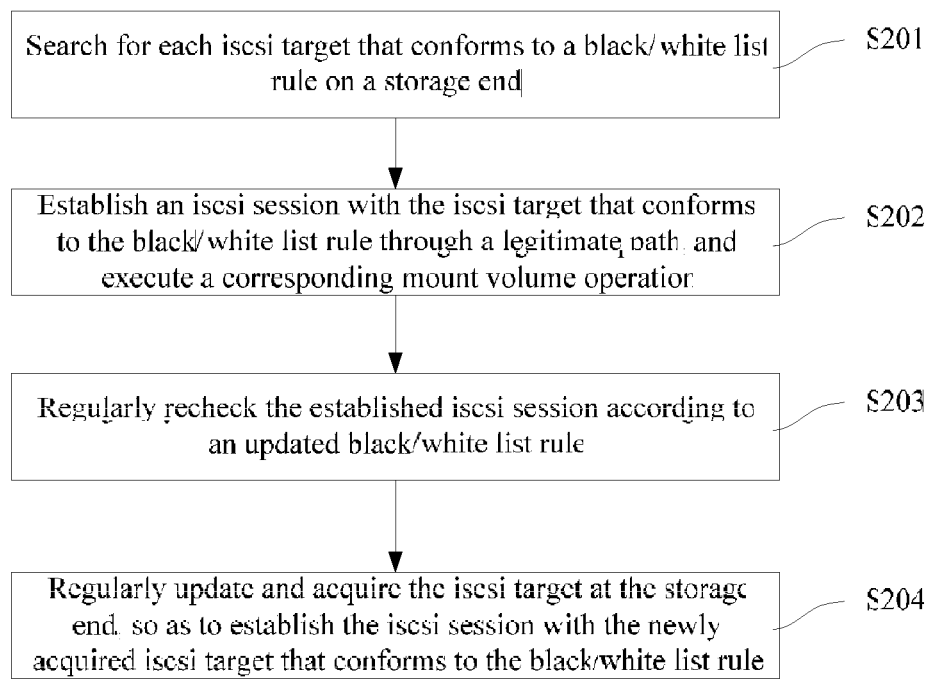
FIG. 2 illustrates a flowchart of an iscsi multi-path management method according to the embodiments of the present disclosure.

Referring to FIG. 2, the embodiments of the present disclosure provide an iscsi multi-path management method, which is applied to a client. The client stores a routing table that is updated and maintained in real time according to a current network topology, and the routing table records legitimate paths that are between a storage end and the client and conform to a black/white list rule. The method includes the following operations.

At S201, each iscsi target that conforms to the black/white list rule at the storage end is searched.

At S202, an iscsi session is established with the iscsi target that conforms to the black/white list rule through a legitimate path, and a corresponding mount volume operation is executed.

At S203, the established iscsi session is rechecked regularly according to an updated black/white list rule.

At S204, the iscsi target at the storage end is updated and acquired regularly, so as to establish the iscsi session with the newly acquired iscsi target that conforms to the black/white list rule.

It can be seen that, in the embodiments of the present disclosure, the legitimate path that allows to bear the iscsi traffic is updated and set in real time, so as to create the iscsi session for the corresponding iscsi target according to the corresponding legitimate path, and the black/white list rule and the iscsi target at the storage end are updated in real time, thereby realizing adaptive iscsi path adjustment under a plurality of application scenarios and application requirements, that is, automatically querying all iscsi targets, automatically connecting the legitimate iscsi targets, and automatically logging off the invalid illegitimate iscsi sessions. Therefore, the solution in the embodiments of the present disclosure may effectively improve applicability of the multi-path management system, greatly simplify configuration and reduce configuration workload, and improve management efficiency.

Specific contents of the abovementioned iscsi multi-path management method may refer to the foregoing detailed description of the iscsi multi-path management system, which will not be elaborated herein.

In some exemplary embodiments, on the basis of the abovementioned content of the iscsi multi-path management method provided by the embodiments of the present disclosure, the black/white list rule is stored in a form of a blacklist and/or a whitelist. The blacklist and the whitelist are generated by the routing module 200 according to an input configuration instruction.

The blacklist records port IPs and network links that are not allowed to bear iscsi traffic. The whitelist records port IPs and network links that are allowed to bear iscsi traffic.

In some exemplary embodiments, on the basis of the abovementioned content of the iscsi multi-path management method provided by the embodiments of the present disclosure, the generation process of the routing table includes the following operations.

Port IPs and network links that are allowed to bear iscsi traffic in the storage end are determined according to the black/white list rule, wherein the determined port IPs form a first IP set, and the determined network links form a first link set.

Network links that are allowed to bear iscsi traffic in the client are determined according to the black/white list rule, wherein the determined network links form a second link set.

The first IP set, the first link set, and the second link set are respectively acquired and updated regularly according to the updated black/white list rule.

A legitimate path with the client is configured for each port IP in the first IP set in a legitimate network topology. The legitimate network topology is a network topology formed by the first link set and the second link set.

In some exemplary embodiments, on the basis of the abovementioned content of the iscsi multi-path management method provided by the embodiments of the present disclosure, the operation that the legitimate path with the client is configured for each port IP in the first IP set in the legitimate network topology includes the following operation.

The legitimate path with the client is configured for each port IP in the first IP set in the legitimate network topology according to a load balancing principle.

In some exemplary embodiments, on the basis of the abovementioned content of the iscsi multi-path management method provided by the embodiments of the present disclosure, the generation process of the routing table further includes the following operations.

Network links that are allowed to bear iscsi traffic between other devices in the network are determined according to the black/white list rule, wherein the determined network links form a third link set. The legitimate network topology is a network topology formed by the first link set, the second link set, and the third link set.

In some exemplary embodiments, on the basis of the abovementioned content of the iscsi multi-path management method provided by the embodiments of the present disclosure, the operation that the established iscsi session is rechecked regularly according to the updated black/white list rule includes the following operations.

The updated black/white list rule is acquired regularly, and iscsi sessions, that are in an invalid state or do not conform to the updated black/white list rule, in respective currently established iscsi sessions are logged off.

In some exemplary embodiments, on the basis of the abovementioned content of the iscsi multi-path management method provided by the embodiments of the present disclosure, after the iscsi sessions, that are in the invalid state or do not conform to the updated black/white list rule, in respective currently established iscsi sessions are logged off, the method further includes the following operations.

Whether there is a remaining valid iscsi session is determined.

In a case where there is no remaining valid session, then the storage volume manager 102 is notified to execute an unmount volume operation.

Figure 3:
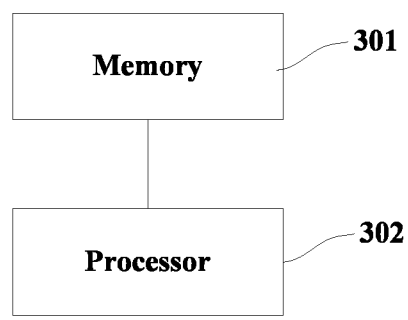
FIG. 3 illustrates a block structural diagram of an electronic device according to the embodiments of the present disclosure.

Referring to FIG. 3, the embodiments of the present disclosure provide an electronic device, which includes a memory 301 and a processor 302.

The memory 301 is adapted to store a computer program.

The processor 302 is adapted to execute the computer program to implement the operations of any iscsi multi-path management method as described above.

Further, the embodiments of the present disclosure provide a computer-readable storage medium. The computer-readable storage medium stores a computer program. The computer program is used for implementing the operations of any iscsi multi-path management method as described above when being executed by a processor.

Specific contents of the abovementioned electronic device and the computer-readable storage medium may refer to the foregoing detailed description of the iscsi multi-path management system, which will not be elaborated herein.

Various embodiments in the present disclosure are described in a progressive mode. Each embodiment focuses on differences from other embodiments, and the same and similar parts of various embodiments may refer to one another. The method disclosed by the embodiments is described relatively simply since it corresponds to the system disclosed by the embodiments, and relevant part may refer to the description of a system section.

It is also to be noted that, in the document of the present disclosure, relational terms such as "first" and "second" used merely to distinguish one entity or operation from another entity or operation, and do not necessarily require or imply the existence of any such actual relationship or order between these entities or operations. Moreover, the terms "include", "contain" or any other variations thereof are intended to cover a non-exclusive inclusion, such that a process, method, article or device including a series of elements not only includes those elements, but also includes those elements that are not explicitly listed, or includes elements inherent to such a process, method, article or device. In the absence of more restrictions, elements defined by the phrase "include a/an . . . " do not exclude the existence of additional identical elements in the process, method, commodity, or device that includes the elements.

The technical solutions provided in the embodiments of the present disclosure are introduced in detail above. Herein, specific examples are used to describe the principle and implementation modes of the present disclosure. The description of the embodiments above is merely intended to help understand the method and its core idea of the present disclosure. It is also to be noted that those having ordinary skill in the art may make modifications based on the idea of the present disclosure with respect to the specific implementation manners and the application scope.

What is claimed is:

1. An Internet Small Computer System Interface (iscsi) multi-path management method, applied to a client, wherein the client stores a routing table that is updated and maintained in real time according to a current network topology, and the routing table records legitimate paths that are between a storage end and the client and conform to a black/white list rule; the method includes:
   searching for each iscsi target that conforms to the black/white list rule at the storage end;
   establishing an iscsi session with the iscsi target that conforms to the black/white list rule through a legitimate path, and executing a mount volume operation;
   regularly rechecking the established iscsi session according to an updated black/white list rule; and
   regularly updating and acquiring the iscsi target at the storage end, so as to establish the iscsi session with the newly acquired iscsi target that conforms to the updated black/white list rule.

2. An electronic device, comprising:
   a memory, adapted to store a computer program; and
   a processor, adapted to execute the computer program to implement following operations of an Internet Small Computer System Interface (iscsi) multi-path management method applied to a client, wherein the client stores a routing table that is updated and maintained in real time according to a current network topology, and the routing table records legitimate paths that are between a storage end and the client and conform to a black/white list rule:
   searching for each iscsi target that conforms to the black/white list rule at the storage end;
   establishing an iscsi session with the iscsi target that conforms to the black/white list rule through a legitimate path, and executing a mount volume operation;
   regularly rechecking the established iscsi session according to an updated black/white list rule; and
   regularly updating and acquiring the iscsi target at the storage end, so as to establish the iscsi session with the newly acquired iscsi target that conforms to the updated black/white list rule.

3. A non-transitory computer-readable storage medium, wherein the computer-readable storage medium stores a computer program; and
   the computer program, when being executed by a processor, is used for implementing following operations of an Internet Small Computer System Interface fiscsi) multi-path management method applied to a client, wherein the client stores a routing table that is updated and maintained in real time according to a current network topology, and the routing table records legitimate paths that are between a storage end and the client and conform to a black/white list rule:
   searching for each iscsi target that conforms to the black/white list rule at the storage end;
   establishing an iscsi session with the iscsi target that conforms to the black/white list rule through a legitimate path, and executing a mount volume operation;
   regularly rechecking the established iscsi session according to an updated black/white list rule; and
   regularly updating and acquiring the iscsi target at the storage end, so as to establish the iscsi session with the newly acquired iscsi target that conforms to the updated black/white list rule.

4. The electronic device according to claim 2, wherein the black/white list rule is stored in a form a blacklist and/or a whitelist; the blacklist and the whitelist are generated by the processor according to an input configuration instruction, wherein
   the blacklist records port Internet Protocol (IPs) and network links that are not allowed to bear iscsi traffic; and the whitelist records port IPs and network links that are allowed to bear iscsi traffic.

5. The electronic device according to claim 2, wherein the processor is adapted to execute the computer program to:
   determine port Internet Protocol (IPs) and network links that are allowed to bear iscsi traffic in the storage end according to the black/white list rule, wherein the determined port IPs form a first IP set, and the determined network links form a first link set;

determine network links that are allowed to bear iscsi traffic in the client according to the black/white list rule, wherein the determined network links form a second link set;
regularly acquire and update the first IP set, the first link set, and the second link set according to the updated black/white list rule; and
configure a legitimate path with the client for each port IP in the first IP set in a legitimate network topology, wherein the legitimate network topology is a network topology formed by the first link set and the second link set.

6. The electronic device according to claim 5, wherein the processor is adapted to execute the computer program to:
configure the legitimate path with the client for each port IP in the first IP set in the legitimate network topology according to a load balancing principle.

7. The electronic device according to claim 5, wherein the processor is adapted to execute the computer program to:
determine network links that are allowed to bear iscsi traffic between other devices in a network according to the black/white list rule, wherein the determined network links form a third link set; and
the legitimate network topology is a network topology formed by the first link set, the second link set, and the third link set.

8. The electronic device according to claim 2, wherein the processor, when rechecking the established iscsi session regularly according to the updated black/white list rule, is adapted to execute the computer program to:
regularly acquire the updated black/white list rule, and log off iscsi sessions, that are in an invalid state or do not conform to the updated black/white list rule, in respective currently established iscsi sessions.

9. The electronic device according to claim 8, wherein the processor is adapted to execute the computer program to:
notify the storage volume manager to execute an unmount volume operation in a case where there is no remaining valid iscsi session after logging off the iscsi sessions, that are in the invalid state or do not conform to the updated black/white list rule, in the respective currently established iscsi sessions.

10. The electronic device according to claim 2, wherein the processor is adapted to execute the computer program to:
access the storage end after a dependent service is ready to start, query each iscsi target at the storage end, and determine whether each iscsi target conforms to the black/white list rule.

11. The electronic device according to claim 10, wherein the processor is adapted to execute the computer program to:
in a case where the iscsi target conforms to the black/white list rule, carry out a connection to a port IP of the iscsi target, and establish the corresponding iscsi session.

12. The electronic device according to claim 11, wherein the processor is adapted to execute the computer program to:
notify the storage volume manager to execute the mount volume operation for a volume corresponding to the iscsi session.

13. The electronic device according to claim 2, wherein the processor, when executing the mount volume operation, is adapted to execute the computer program to:
acquire a Universally Unique Identifier (UUID) corresponding to a storage volume, query whether there is a multi-path device corresponding to the UUID by accessing a multi-path driver, mount the multi-path device in a case where there is the multi-path device corresponding to the UUID, and return corresponding prompt information in a case where there is no multi-path device corresponding to the UUID.

14. The electronic device according to claim 9, wherein the processor, when executing the unmount volume operation, is adapted to execute the computer program to:
acquire a Universally Unique Identifier (UUID) corresponding to the storage volume, query a multi-path device corresponding to the UUID by accessing the multi-path driver, query iscsi devices in various iscsi sessions corresponding to the multi-path device, delete the queried iscsi devices, and then delete the multi-path device.

15. The iscsi multi-path management method according to claim 1, wherein the black/white list rule is stored in a form a blacklist and/or a whitelist; the blacklist and the whitelist are generated according to an input configuration instruction, wherein
the blacklist records port Internet Protocol (IPs) and network links that are not allowed to bear iscsi traffic; and the whitelist records port IPs and network links that are allowed to bear iscsi traffic.

16. The iscsi multi-path management method according to claim 1, wherein a generation process of the routing table comprises:
determining port Internet Protocol (IPs) and network links that are allowed to bear iscsi traffic in the storage end according to the black/white list rule, wherein the determined port IPs form a first IP set, and the determined network links form a first link set;
determining network links that are allowed to bear iscsi traffic in the client according to the black/white list rule, wherein the determined network links form a second link set;
regularly acquiring and updating the first IP set, the first link set, and the second link set according to the updated black/white list rule; and
configuring a legitimate path with the client for each port IP in the first IP set in a legitimate network topology, wherein the legitimate network topology is a network topology formed by the first link set and the second link set.

17. The iscsi multi-path management method according to claim 16, wherein configuring the legitimate path with the client for each port IP in the first IP set in the legitimate network topology comprises:
configuring the legitimate path with the client for each port IP in the first IP set in the legitimate network topology according to a load balancing principle.

18. The iscsi multi-path management method according to claim 16, wherein a generation process of the routing table further comprises:
determining network links that are allowed to bear iscsi traffic between other devices in a network according to the black/white list rule, wherein the determined network links form a third link set; and
the legitimate network topology is a network topology formed by the first link set, the second link set, and the third link set.

19. The iscsi multi-path management method according to claim 1, wherein regularly rechecking the established iscsi session according to the updated black/white list rule comprises:
regularly acquiring the updated black/white list rule, and logging off iscsi sessions, that are in an invalid state or do not conform to the updated black/white list rule, in respective currently established iscsi sessions.

20. The iscsi multi-path management method according to claim 19, wherein after the iscsi sessions, that are in the invalid state or do not conform to the updated black/white list rule, in respective currently established iscsi sessions are logged off, the method further comprises:
- determining whether there is a remaining valid iscsi session;
- notifying a storage volume manager to execute an unmount volume operation in a case where there is no remaining valid iscsi session.

* * * * *